United States Patent
Ahluwalia et al.

(10) Patent No.: US 10,455,475 B1
(45) Date of Patent: Oct. 22, 2019

(54) INTER-LAYER COMMUNICATIONS IN WIRELESS NETWORKS INCLUDING A HIGH LATENCY CONNECTION

(71) Applicants: Sandeep Ahluwalia, Germantown, MD (US); Channasandra Ravishankar, Germantown, MD (US); Charles Barnett, Germantown, MD (US)

(72) Inventors: Sandeep Ahluwalia, Germantown, MD (US); Channasandra Ravishankar, Germantown, MD (US); Charles Barnett, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/228,662

(22) Filed: Dec. 20, 2018

Related U.S. Application Data

(60) Provisional application No. 62/677,651, filed on May 29, 2018.

(51) Int. Cl.
*H04W 4/00* (2018.01)
*H04W 36/32* (2009.01)
(Continued)

(52) U.S. Cl.
CPC ....... *H04W 36/32* (2013.01); *H04W 36/0016* (2013.01); *H04W 36/0022* (2013.01); *H04W 36/08* (2013.01); *H04W 84/06* (2013.01)

(58) Field of Classification Search
CPC .............................. H04W 36/04; H04W 36/02
See application file for complete search history.

(56) References Cited

U.S. PATENT DOCUMENTS

2017/0331670 A1* 11/2017 Parkvall ............ H04W 52/0274
2018/0270103 A1* 9/2018 Chapman ................ H04L 41/06

FOREIGN PATENT DOCUMENTS

| WO | 2006007328 A3 | 5/2006 |
| WO | 2016205765 A1 | 12/2016 |
| WO | 2017177075 | 10/2017 |

OTHER PUBLICATIONS

International search report for WO patent application No. PCT/US2019/033817.

(Continued)

*Primary Examiner* — Omoniyi Obayanju
(74) *Attorney, Agent, or Firm* — Capitol City TechLaw; Jabir Singh

(57) ABSTRACT

A system and method for interfacing a User Equipment (UE) to a Core Network (CN) is disclosed. The method including: providing a high latency connection; providing a satellite network portal (SNP) to connect to the UE via a satellite link, wherein the SNP includes a Media Access Control (MAC) layer for managing the satellite link and a Radio Layer Control (RLC) layer of the UE; interfacing the UE to the CN with a Point of Presence (POP) including a Radio Resource Control (RRC) layer of the UE and a Packet Data Convergence Protocol (PDCP) layer of the UE; and establishing a session between the CN and the UE via the RRC layer, the PDCP layer and the RLC layer. In the method, network traffic, between the SNP and the POP, over the high latency connection has a latency greater than 10 milliseconds (ms), the session does not timeout due to the latency of the high latency connection, and the MAC layer schedules bandwidth for the establishing over the satellite link.

21 Claims, 7 Drawing Sheets

(51) Int. Cl.
*H04W 36/08* (2009.01)
*H04W 36/00* (2009.01)
*H04W 84/06* (2009.01)

(56) References Cited

OTHER PUBLICATIONS

Thales: "NR-NTN; Proposed recommendations", 3GPP Draft; R1-1806473 NR-NTN Proposed Recommendations V5, 3RD Generationpartnership Project (3GPP), Mobile Competence Centre ; 650, Route Des Lucioles ; F-06921 Sophia-Antipolis Cedex; France vol. RAN WG1, No. Busan, Korea; 20180521—20180525, May 20, 2018 (May 20, 2018), XP051441675, Retrieved from the Internet: URl: http/www.3gp.org/ftp/Meetings%5F3GPP%5FSYNC/RAN1/Docs/ [retrieved on May 20, 2018]; table 8.3.2, tables 8.4-1.

Thales: "TR 103 274 LTE operation via satellite v0.0.8", ETST Draft; SESSCN(17)000030, European Telecommunications Standards Institute (ETSI), 650, Route Des Lucioles ; F-06921 Sophia-Antipolis ; France, No. .0.8, Feb. 28, 2017 (Feb. 28, 2017), pp. 1-72,XP014288453, Retrieved from the Internet: URL:docbox.etsi.org\SES\SES\60-WGs\WG SCN\05-CONTRIBUTIONS\2017\SESSCN(17)000030_TR_103_274_LTE_operation_via+satellite_v0_0_8\SE-0026v1708.docx [retrieved on Feb. 28, 2017]; paragraph.

\* cited by examiner

INTER-LAYER COMMUNICATIONS IN WIRELESS NETWORKS INCLUDING A HIGH LATENCY CONNECTION

FIELD

For $4^{th}$ Generation (4G) and $5^{th}$ Generation (5G) wireless systems based on Low Earth Orbit (LEO) or Medium-Earth Orbit (MEO) satellites, the present teachings disclose placing user contexts for upper layer protocols in a relatively stationary anchor subsystem to minimize overhead associated with a movement of a User Equipment (UE) and its associated context. The present teachings also disclose placing lower layer protocols in subsystems that move as needed with the moving satellites.

BACKGROUND

Low Earth Orbit (LEO) or Medium-Earth Orbit (MEO) based $4^{th}$ Generation (4G) and $5^{th}$ Generation (5G) systems need to handle the very frequent beam, satellite and gateway handovers necessitated by the movement of the LEO/MEO satellite about the earth that is independent of a movement of a User Equipment (UE).

4G and 5G systems based on LEO/MEO satellites will use a terrestrial Core Network (CN) to take full advantage of hundreds of person-years of effort that would have gone into aspects of mobility management, session management, authentication, billing etc. However, unlike terrestrial 4G and 5G systems, these LEO/MEO systems will need to handle very frequent beam, satellite and gateway handovers even when UE does not move. It is therefore desirable to hide the effects of constellation movement from the core network.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

$4^{th}$ Generation (4G) and $5^{th}$ Generation (5G) systems based on Low Earth Orbit (LEO) or Medium-Earth Orbit (MEO) satellites may use terrestrial Commercial Off-The-Shelf (COTS) core network to leverage aspects of mobility management, session management, authentication, billing and the like in the present-day cellular systems. It is desirable to hide the effects of constellation movement from a COTS core network. The present teachings minimize the latency in session setup even when a Point of Presence (POP) and a Satellite Network Portal (SNP) including a radio are located far away or remote from one another. In the present teachings a conventional serial layer configuration is replaced with a proxy-based and parallel activation.

A method for interfacing a User Equipment (UE) to a Core Network (CN) is disclosed. The method including: providing a high latency connection; providing a satellite network portal (SNP) to connect to the UE via a satellite link, wherein the SNP includes a Media Access Control (MAC) layer for managing the satellite link and a Radio Layer Control (RLC) layer of the UE; interfacing the UE to the CN with a Point of Presence (POP) including a Radio Resource Control (RRC) layer of the UE and a Packet Data Convergence Protocol (PDCP) layer of the UE; and establishing a session between the CN and the UE via the RRC layer, the PDCP layer and the RLC layer. In the method, network traffic, between the SNP and the POP, over the high latency connection has a latency greater than 10 milliseconds (ms), the session does not timeout due to the latency of the high latency connection, and the MAC layer schedules bandwidth for the establishing over the satellite link.

A system to interface a User Equipment (UE) to a Core Network (CN) disclosed. The system including: a high latency connection; a satellite network portal (SNP) to connect to the UE via a satellite link, wherein the SNP comprises a Media Access Control (MAC) layer for managing the satellite link and a Radio Layer Control (RLC) layer of the UE; a Point of Presence (POP), to interface the UE to the CN. comprising a Radio Resource Control (RRC) layer of the UE and a Packet Data Convergence Protocol (PDCP) layer of the UE; and a session established between the CN and the UE via the RRC layer, the PDCP layer and the RLC layer. In the system, network traffic, between the SNP and the POP, over the high latency connection has a latency greater than 10 milliseconds (ms), the session does not timeout due to the latency of the high latency connection, and the MAC layer schedules bandwidth for the session over the satellite link.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
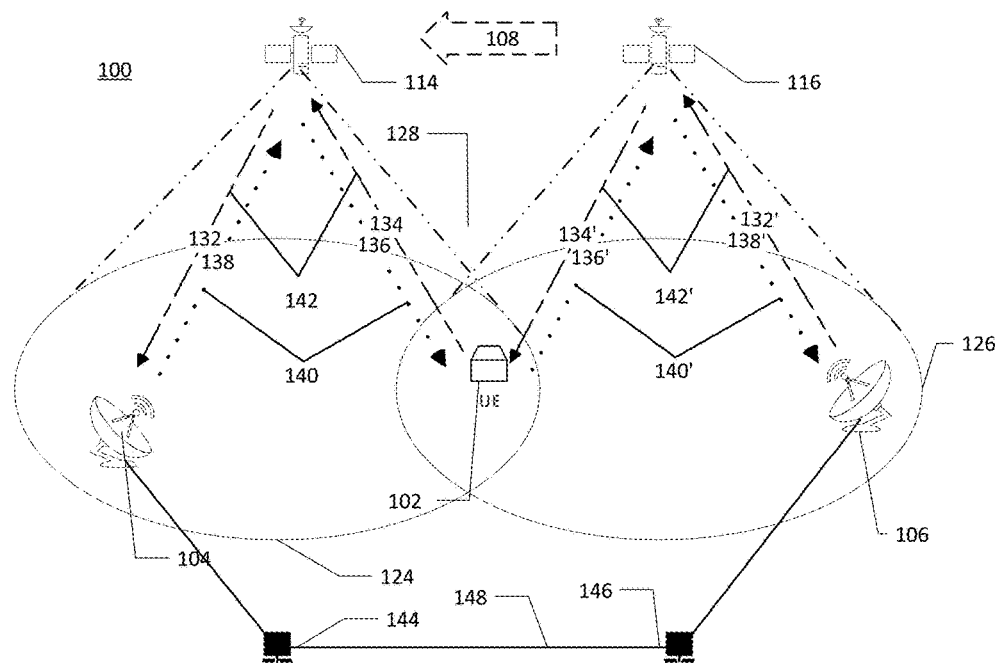
FIG. 1 illustrates an exemplary Low Earth Orbit (LEO) system with a User Equipment (UE) according to various embodiments.

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings provide high throughput connectivity from a User Equipment (UE) to a Core Network (CN) of the cellular system and/or to an associated Internet Point of Presence (POP). For $4^{th}$ Generation (4G) and $5^{th}$ Generation (5G) ("cellular") systems based on Low Earth Orbit (LEO) or Medium-Earth Orbit (MEO) satellites, the present teachings disclose placing user contexts for upper layer protocols in a relatively stationary anchor subsystem, such as, an Internet Point of Presence (POP), to minimize overhead associated with a movement of a UE and its associated context. Exemplary upper layer protocols used in cellular systems include the Packet Data Convergence Protocol (PDCP), the Radio Resource Control (RRC) protocol, or the like. The PDCP and RRC contexts are designed to insulate the Core Network from the frequent LEO/MEO handovers.

The present teachings disclose placing lower layer protocols in an SNP that communicates with the moving satellites. Exemplary lower layer protocols used in cellular systems include Physical (PHY) layer, Media Access Control (MAC) layer, Radio Layer Control (RLC) or the like. The present teachings disclose how to provide best radio coverage while minimizing a count of SNPs. The location of the SNPs can be chosen to get the maximum radio coverage while minimizing the number of SNPs.

The present teachings disclose protocol layers to communicate between the SNP and the POP. In some embodiments, primitives defined for inter-layer communication across the link between a SNP and a POP may be used. These primitives are typically designed for use where inter-layer communication happens within co-located equipment, or in the same processor, board, chassis or the like. As such, the inter-layer exchanges are typically serial in nature. These protocols are well-suited for use when an RTT delay/latency between the SNP and the POP is low, for example, less than 20 milliseconds (ms), less than 15 ms, less than 10 ms, or the like, without causing significant impact to overall operation of an air interface.

When the delay between the SNP and the POP is higher, the serial nature of these exchanges may significantly impact and overall performance of the air interface. For example, four exchanges between the SNP and the POP with a 20 ms one-way delay will incur 160 ms of delay. In contrast, when the one-way SNP and POP delay is increased to 100 ms, the delay increases to 800 ms, a delay that is noticeable by a user at the UE.

LEO/MEO systems can be designed using customized versions of terrestrial 4G and 5G protocols while LEO/MEO satellite and beam handovers are taking place. In exemplary embodiments, a link towards the Core Network does not change while LEO/MEO satellite and beam handovers are taking place, LEO/MEO constellations require frequent handovers to maintain the user link. The frequency can range from tens of seconds to tens of minutes. A UE is served by a satellite that happens to cover the UE at that time. As the satellite moves, the UE is handed over to a different beam served by the same satellite when the satellite motion results in the UE reaching an edge of the beam's coverage. When the satellite movement causes the UE to reach an edge of the satellite's coverage, the UE is reassigned to a beam of a different satellite providing coverage for the area where the UE is disposed.

During operation, a UE dynamically connects to the CN via an SNP and a LEO satellite in communication with the SNP. The PHY layer handles the signal processing in the downlink (SNP→Satellite→UE) and uplink (UE→Satellite→SNP) directions. The downlink and uplink are shared radio channels. The MAC layer schedules downlink and uplink resources to the UEs over the satellite link.

In some embodiments, the joint interoperability of the SNP and the POP may be configured as an enhanced Node B (e-NB). As such, the present interoperability of the SNP and the POP interfaces a UE with the CN, while providing an improved user experience and lessening the overhead in the RLC layer as the MAC layer for the satellite link tracks the changes caused by the relative movement of the satellite and the UE. In the e-NB including the SNP and the POP, the SNP acts as a mostly static anchor node interfacing with the CN, while the dynamicity of the frequently changing satellite link is offloaded to an interface between the POP and the UE.

The Radio Link Control (RLC) layer is used in 4G and 5G systems to recover from errors on the radio link in the downlink and uplink directions. The RLC layer provides a Layer-2 ARQ between a UE and an enhanced Node B (e-NB). This RLC layer is distinct from the uplink and downlink between the SNP and the UE over a satellite link. In some embodiments, the uplink and downlink over the satellite link are a backhaul for communications between the UE and the CN.

The Packet Data Convergence Protocol (PDCP) is used in 4G and 5G systems to perform user and control plane data transfer, and ciphering and integrity protections between the UE and an endpoint connected to or within the CN.

The present teachings operate with frequent handovers by maintaining a primary UE context at a POP that remains anchored and by changing the SNP as necessitated by the handovers. In exemplary embodiments, the handovers are handled by:

Changing the MAC and PHY layers for Intra SNP handovers

Changing the RLC, MAC and PHY layers for Inter SNP handovers

Moreover, when the link between the SNP and the POP is error-prone, the delays in recovery become larger and more pronounced. As such the present teachings disclose a method and system to mitigate or ameliorate the effects of a long one-way SNP-POP delay and/or high transmission error rates on the SNP-POP link. The present teachings use one or more of a protocol function relocation, a combining or parallel operation of the protocol requests and responses to minimize the delay and/or high transmission error rates. For relocation, the present teachings relocate components to minimize message handshakes over the SNP-POP links. For combining, the present teachings may combine two sequential handshakes into a single handshake. For a parallel operation, the present teachings may restructure sequential handshakes so that they can operate in parallel.

In some embodiments, the RLC performance may be optimized by moving the RLC layer to the SNP, a reduction in RLC Round Trip Time (RTT) in a downlink and uplink, or the like.

In some embodiments, RRC Connection Setup procedure may optimize the random-access procedure, the contention resolution, Msg-3 and Msg-4 handshakes by merging and parallelizing of signaling over the SNP-POP wide-area network (WAN), a reduction in the RRC connection setup time, or the like.

In some embodiments, a service request procedure may optimize an Attach procedure, a security procedure, a UE position handling, a default bearer setup by merging and parallelizing of signaling over the SNP-POP WAN, a reduction of resumption of an existing session, or the like.

Although the examples herein use a LEO satellite, the present teachings may be applied where there is a relative movement between a relay such as the LEO satellite and the UE. Low Earth Orbit (LEO) constellations require frequent handovers to maintain the user link. The user is served by a satellite that happens to cover the UE at that time. As the satellite moves, the user will be handed over to a different beam served by the same satellite. Once the satellite motion results in the UE reaching the edge of the coverage, the UE will be reassigned to another beam. For example, the RF beam providing service to a stationary UE may be switched to another RF beam of the same satellite every 10 to 20 seconds; the satellite servicing the UE may be switched every 10 to 20 minutes; and a gateway servicing the satellite may be switched similarly. Other platforms that may work as a relay include a Medium Earth Orbit (MEO) constellation, a High-Altitude Platform (HAP), or the like. In some embodiments, the UE may be rapidly moving with respect to a point Earth's surface, for example, when the UE is deployed in a moving aircraft. In some embodiments, the UE and the relay may both be moving with respect to a point on the Earth's surface.

The system architecture can be optimized to operate with frequent handovers by maintaining a primary UE context at an anchor FIG. 1 illustrates an exemplary Low Earth Orbit (LEO) system with a User Equipment (UE) according to various embodiments.

FIG. 1 illustrates an exemplary LEO system 100, with a terminal or UE 102 communicating with a SNP 104 via a setting LEO satellite 114 moving with respect to a location of the UE 102 such that the UE 102 will be imminently out of a coverage area 124 of the LEO satellite 114. Such a satellite might be termed a "setting" satellite with respect to that UE, in an analogous way that the Sun might be viewed as setting with respect to a given location on the Earth. The terms "setting" and "rising" for satellites may be used with respect to a UE location or with respect to a SNP location. The UE 102 may be within a coverage area 126 of a rising LEO satellite 116, in other words, the UE 102 is disposed an intersection or overlap 128 of the coverage area 124 and the coverage area 126. The LEO satellite 116 might be said to be "rising" with respect to the UE 102, analogous to the rising Sun. An arrow 108 in FIG. 1a indicates a direction of travel of the LEO satellite 114 and the LEO satellite 116.

The LEO satellite 116 may be served via the SNP 104, in other words, same instance of the SNP 104 may serve the LEO satellite 114 and the LEO satellite 116. The LEO satellite 116 may be served via a SNP 106, in other words, different SNPs may serve the LEO satellites 114 and 116. The SNP 104 may be connected to the SNP 106 via a terrestrial link. In some embodiments, the SNP 104 may be connected to the SNP 106 via a satellite link. Use of SNP 104 or 106 may depend on SNP locations and their visibility to a respective satellite.

The UE 102 and the SNP 104 may communicate with the LEO satellite 114 via uplinks 134, 138 and downlinks 132, 136. The links 132, 134, 136, 138 may use spot beams provided by the LEO satellite 114 for coverage of specified cells, where the UE 102 and/or SNP 104 is disposed. Transmissions from the SNP 104 to the UE 102 use the uplink 138 and the downlink 136; the group of links (links 138, 136) used to communicate from the SNP 104 to the UE 102 maybe referred to as a forward link or outroute 140. Transmissions from the UE 102 to the SNP 104 use the uplink 134 and the downlink 132; the group of links (links 134, 132) used to communicate from the UE 102 to the SNP 104 maybe referred to as a return link or inroute 142.

In some embodiments, to maintain communication continuity, each of the communication paths, namely the outroute 140 and the inroute 142, may be handed off from the setting LEO satellite 114 to the rising LEO satellite 116 to form an outroute 140' and an inroute 142'. The outroute 140' and inroute 142' may use links 132', 134', 136', 138' between the UE 102 and the SNP 106 via the LEO satellite 116. In addition to switching satellites, the outroute 140 and the inroute 142 may be handed off from the SNP 104 to the SNP 106. In some embodiments, the present teachings are not limited to LEO satellite systems.

Communications signals transmitted to/from the UE 102 can be any combination of standard or proprietary waveforms, for example, a DVB-S or DVB-S2 standard. The SNP 104 and the 106 may be connected to any combination of communications networks, such as, intra-nets, inter-nets, or the Internet. In exemplary embodiments, the LEO satellites 114, 116 may be in communication with more than one of the SNP 104 and the 106. In some embodiments, the SNP 104 and the 106 may be in communication with more than one of the LEO satellites 114, 116. The SNP 104 may be remote from the SNP 106.

In exemplary embodiments, the SNP 104 may be connected to a POP 144, and the SNP 106 may be connected to a POP 146. POP 144 may be connected to POP 146 via a high latency connection 148. POP 144 and SNP 104 may be co-located. In some embodiments, POP 144 may be located remote from the SNP 104. In exemplary embodiments, an SNP location of the SNP 104 may provide In some embodiments, the high latency connection 148 may be a backhaul. In the present teachings, the high latency connection may also be referred to as backhaul. For example, a high latency connection using fiber connections is estimated to have a RTT of about 10 ms over a Wide Area Network (assuming an equipment latency of 1 ms), when a distance between a source and destination is about 350 miles. A connection is considered a high latency connection when an RTT latency is greater than 10 ms, greater than 15 ms, greater than 20 ms or the like.

In some embodiments, the UE 102 of FIG. 1a may be mobile UE, for example, a VSAT disposed in a moving aircraft, in other words, the UE is moving with respect to both the setting and rising satellites. Additionally, a satellite may create a set of spot beams (not shown) to service VSATs within a coverage area. As such, a relative movement between the UE and the satellite may necessitate a handoff of the UE communication path from a first spot beam to a second spot beam of the same satellite. Furthermore, the satellites might be communicatively connected by inter-satellite links (ISLs) (not shown). An ISL is a satellite-to-satellite communication path for selective relay of traffic across the constellation to reach an intended ground station, for example, a SNP or another UE. For such an ISL, simultaneous reception via two satellites and reception via one satellite is applicable. However, a transition from one SNP to another may be unnecessary when an ISL is used to maintain multi-hop connectivity to the same SNP.

In some embodiments, the present teachings may be used for mobile VSATs communicating through a geosynchronous (GEO) satellite. A GEO satellite may orbit the Earth at an altitude of approximately 22,200 miles and with angular velocity aligned to the rotation of the Earth. As such, the GEO satellite appears to remain in approximately the same position in the sky, relative to points on the ground. When a mobile UE travels from a service coverage area of a GEO satellite and into another GEO satellite's service coverage area, communication continuity during the transition may be provided with a handover of a setting path to a rising path.

Figure 2A:
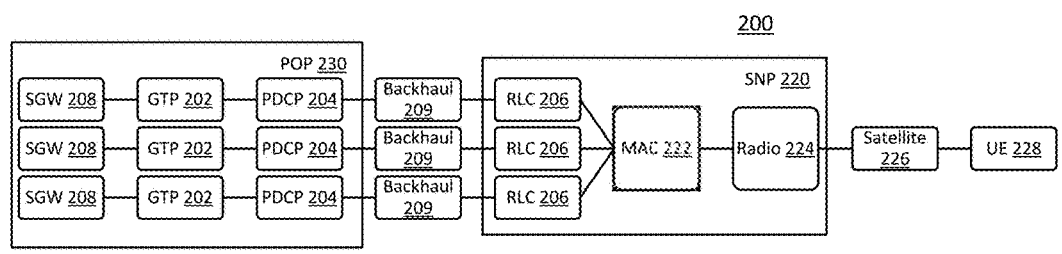
FIG. 2A illustrates a data plane architecture of a network with a Satellite Network Portal (SNP) geographically separated from a Point-of-Presence (POP) for serving a LEO satellite constellation according to various embodiments.

FIG. 2A illustrates a data plane architecture of a network with a Satellite Network Portal (SNP) geographically separated from a Point-of-Presence (POP) for serving a LEO satellite constellation according to various embodiments.

Figure 2B:
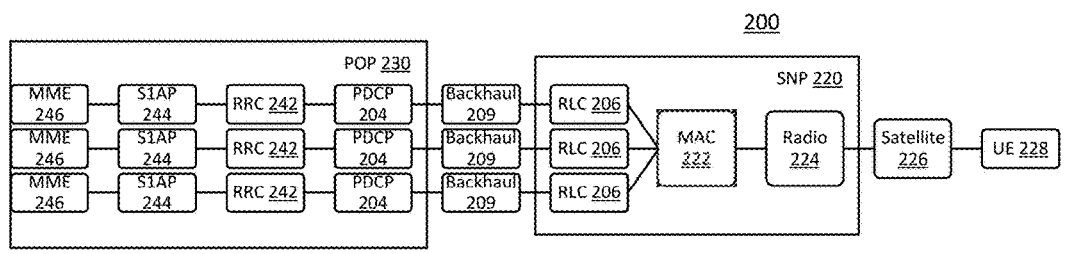
FIG. 2B illustrates a control plane architecture of a network with a Satellite Network Portal (SNP) geographically separated from a Point-of-Presence (POP) for serving a LEO satellite constellation according to various embodiments.

FIG. 2B illustrates a control plane architecture of a network with a Satellite Network Portal (SNP) geographically separated from a Point-of-Presence (POP) for serving a LEO satellite constellation according to various embodiments.

FIG. 2A illustrates a network 200 including a POP 230, an SNP 220, a LEO satellite 226 and a UE 228. In the data plane, a PDCP layer 204, GPRS Tunneling Protocol (GTP) layer 202 and Serving Gateway (SGW) 208 are assigned to the POP 230. As shown in FIG. 2B, an RRC layer 242, a S1AP layer 244 and a Mobility Management Entity (MME) 246 are assigned to the POP 230 in the control plane. In both the data and the control plane, an RLC layer 206, a MAC layer 222 and a Radio 224 layers are handled by the SNP 220. The POP 230 is remote from the SNP 220 and connects to the SNP 220 via the high latency connection 209.

The MAC layer 222 can include a MAC scheduler (not shown) when the radio 224 is a shared resource. For example, with respect to FIG. 1, as the satellite 114 and the UE 102 move with respect to each other, connections for the UE 102 traversing an old beam of the satellite 114 may be handed-over to a new beam of the satellite 116. Handing over between beams of a same satellite is an example of an intra-SNP handover. As such, the MAC 222 and radio 224 of the old beam contexts may be handed-over to the MAC 222 and the radio 224 assigned to the new beam at each hand-over. Another example of an intra-SNP handover is a handover where the old beam and the new beam are from different satellites but managed by the same SNP (for example, SNP 104 of FIG. 1). However, when the old beam is managed by an old SNP and the new beam is managed by a SNP different than the old SNP (for example, the old SNP is SNP 104 and the new SNP is SNP 106), a handover from the old beam to the new beam is an example of an inter-SNP handover. The RLC 206 layer remains fixed or need not be changed for an intra-SNP handover. In some embodiments, a context of the RLC 206 layer is moved/migrated to the new SNP when the handover is inter-SNP.

Regardless of whether the handover is intra or inter SNP, a UE context for the UE 228 associated with managing the PDCP layer 204, the GTP 202, the RRC layer 242, the S1AP layer 244 and the MME 246 is maintained in the POP 230 and there is no handover of the UE context between POPs.

Figure 3:
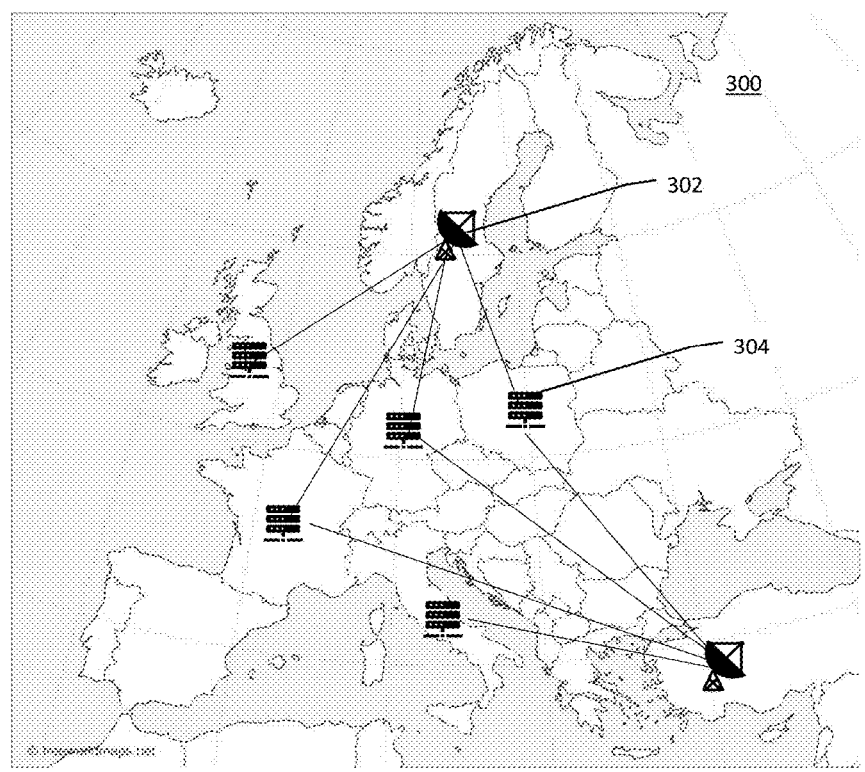
FIG. 3 illustrates an exemplary organization of a POP, an SNP and a high latency connection according to various embodiments.

FIG. 3 illustrates an exemplary organization of a POP, an SNP and a high latency connection according to various embodiments.

FIG. 3 illustrates a map 300 of Europe. In exemplary embodiments, an SNP 302 may be disposed in Sweden and Turkey. The SNP 302 of Sweden may be connected via a high latency connection to a POP 304 in each of United Kingdom, France, Germany and Poland. The SNP 302 of Turkey may be connected via a high latency connection to a POP 304 in each Italy, France, Germany and Poland. The sites for the SNPs 302 and POPs 304 are quite distant from each other as different factors may drive the site selection for an SNP and a POP. For example, the location of SNP sites may be determined based on: maintaining connectivity to the LEO/MEO satellite fleet; availability of large open spaces with a clear view of the sky in virtually all directions, and the like. The location of POP sites may be governed by: legal intercept requirements in different countries; traffic landing requirements from different countries, an ability to connect to multiple SNPs to handle cases where the serving satellite for a user switches between SNPs, availability of Internet Point of Presence, and the like.

The present teachings improve session setup over a satellite link when a POP and an SNP are separated by a high latency connection. As such, session setup is not impacted by a location of the POP. By moving the RLC from the POP to an SNP, the RLC reduces the packet processing delay. The present teachings simplify the handover design and improve performance. The present teachings also improve a user's experience by reducing a latency in session establishment, reconnection, and forwarding. In some embodiments, no data copies are required on every satellite/beam handover. For example, the RLC layer may remain unchanged across intra-SNP handovers. A reliable link between the PDCP and RLC layers may be maintained across a high latency connection link. Custom and standard protocols like TCP and SCTP may be used to provide the reliable link. The ARQ protocol between PDCP and RLC may provide an extensible framework for implementing flow control between the PDCP-DL and RLC-DL layers.

In some embodiments, a shared radio disposed at an SNP site may connect to POPs located in different countries. The cost and land requirements for the SNP may make it impractical to install a complete SNP in every country. A POP may be used for legal intercept requirements in individual countries. In some embodiments, users close to an SNP may be served by a neighboring SNP. This may occur as a satellite covering the UE may be connected only to the neighboring SNP. In such cases, a POP disposed at the SNP site may be connected to a POP disposed at a neighboring SNP. Not every SNP site may have a POP located thereupon.

Similarly, not every POP site may have an SNP disposed thereupon. For example, Low Earth Orbit satellites connect with different ground-based satellite base stations or SNPs as they orbit the Earth. The location of the satellite base stations may be selected for optimal coverage to the satellites. However, legal requirements of different countries may necessitate setting up of separate POPs not co-located with the SNP.

An SNP and a POP may be separated by a few thousand km. At these distances, the SNP-POP roundtrip may dominate an overall channel setup latency.

Figure 4:
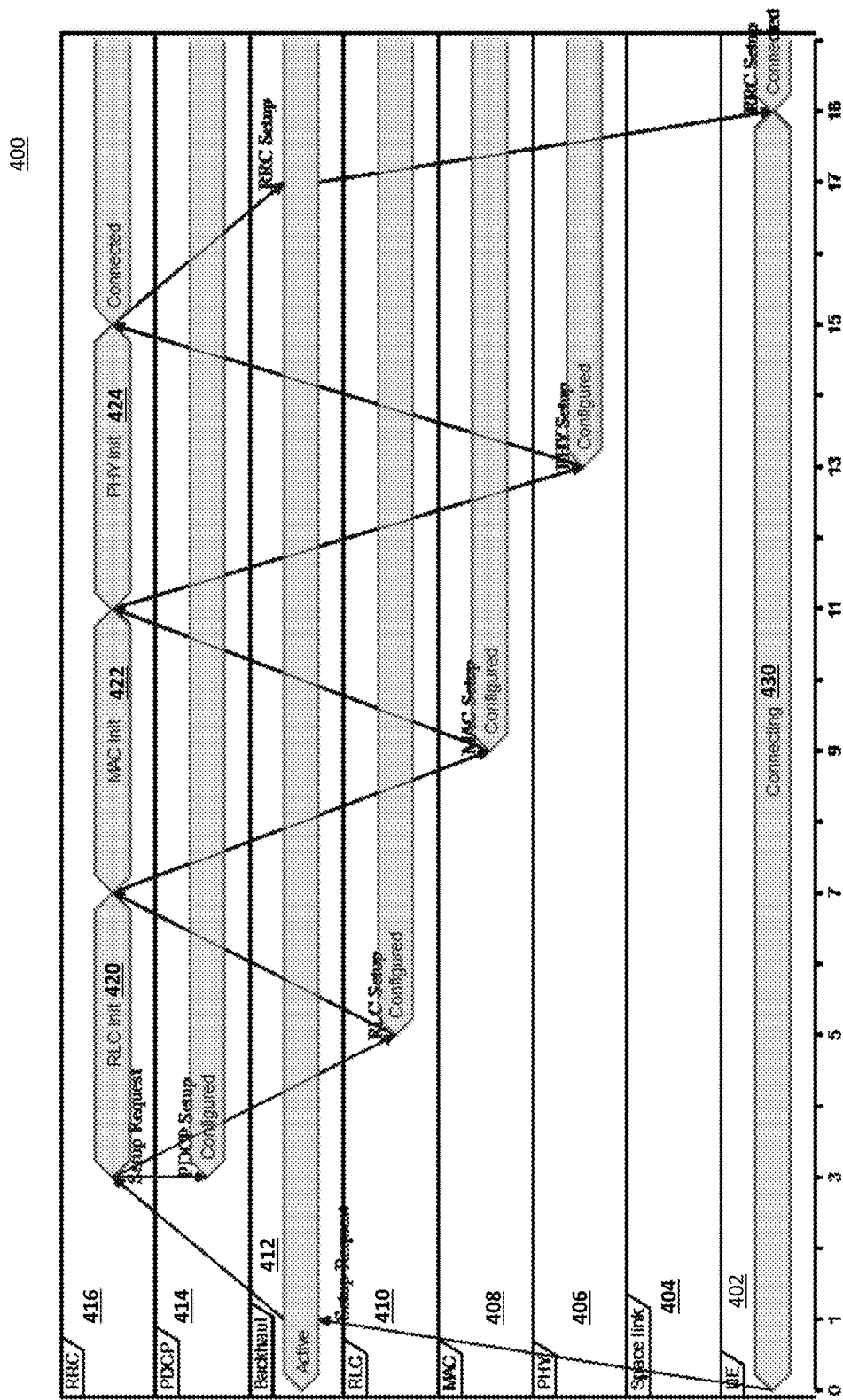
FIG. 4 illustrates a serial protocol layer setup according to various embodiments.

The following sections discuss different schemes for protocol layer configuration. Session setup latency and robustness of the signaling schemes are discussed. The schemes discussed are:

Serial Protocol Layer Configuration
Parallel Protocol Layer Configuration
Proxy Based Protocol Layer Configuration
Access Proxy Based Protocol Layer Configuration Serial Protocol Layer Configuration FIG. 4 illustrates a serial protocol layer setup according to various embodiments.

A geographic separation of an SNP and a POP may pose a performance challenge as protocol stacks typically configure their layers serially, and the serial implementation impacts a SNP-POP delay on a session setup time 430 as illustrated by a serial configuration 400. In the present teachings, a session setup time 430 may traverse from a UE 402 via a space link 404 to a PHY layer 406, a MAC layer 408, an RLC layer 408, a backhaul 410, a PDCP layer 414, and an RRC layer 416. The SNP includes the PHY layer 406, the MAC layer 408, the RLC layer 408, and the RLC layer 410. The POP includes the PDCP layer 414 and the RRC layer 416. The SNP and the POP are connected via a backhaul 410. The session setup time 430 is impacted from SNP-POP handshakes to setup an RLC initialization 420, a MAC initialization 422 and PHY initialization 424. Moreover, a loss of any signaling packet over the SNP-POP backhaul 412 results in costly retransmissions. The retransmissions may result in the UE 402 timing out on setting up the session. This approach exchanges 8 signaling messages over the SNP-POP backhaul 412, thus a degraded backhaul session has a high likely hood of failure due to a retransmission in any of these messages. In FIG. 4, the UE 402 to the SNP delay is assumed to be 1 unit. The delay from the SNP to POP is 2 units. The session setup time 430 is 18 units per FIG. 4.

Parallel Protocol Layer Configuration

Figure 5:
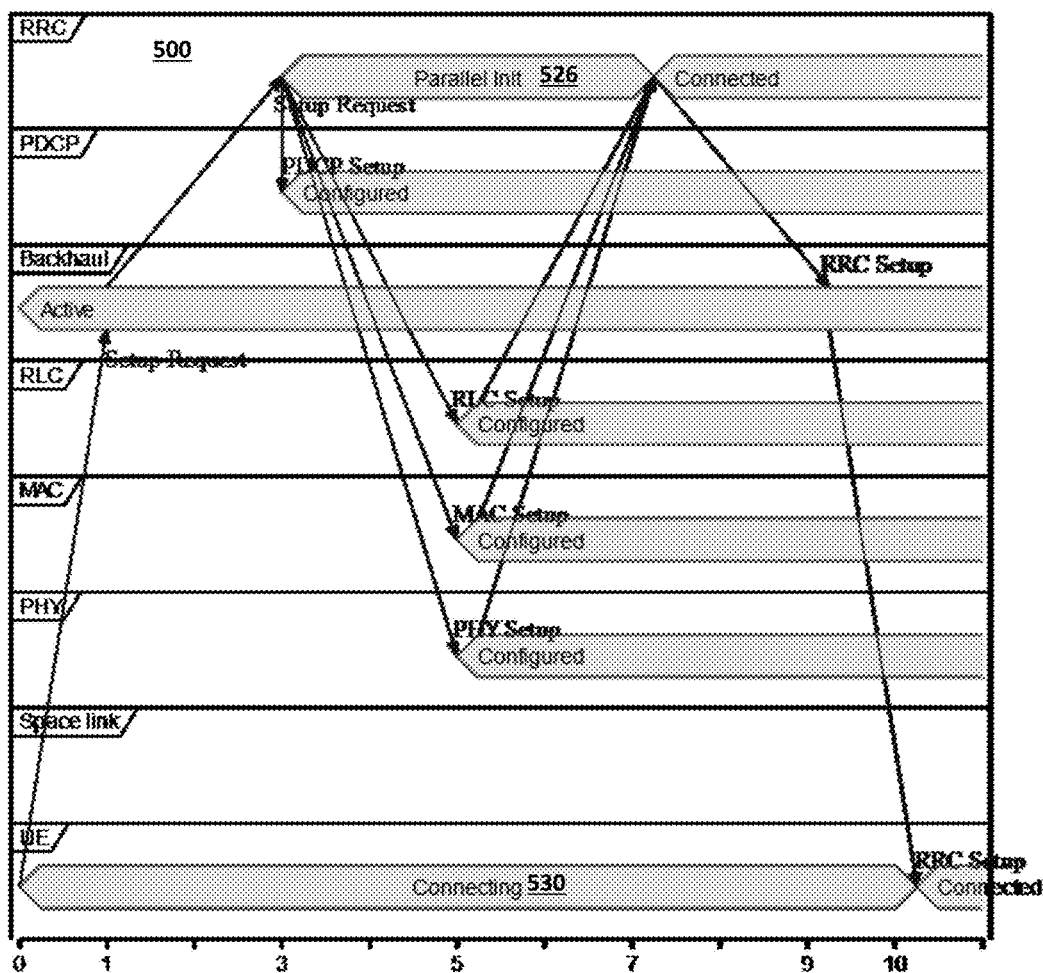
FIG. 5 illustrates a parallel protocol layer setup according to various embodiments.

FIG. 5 illustrates a parallel protocol layer setup according to various embodiments.

FIG. 5 illustrates a session setup time 530 (latency) can be reduced by a parallel initialization 526 during a parallel session configuration 500. With this approach, the RLC, MAC and PHY setups are initiated in parallel. The parallel initialization 526 may reduce the session setup time 530 to 10 units. The parallel initialization 526 may use six messages over an SNP-POP backhaul. The session setup time 530 of the parallel session configuration 500 compares very favorably with the session setup time 430 of 18 units with the serial configuration 400.

Proxy Based Protocol Layer Configuration

Figure 6:
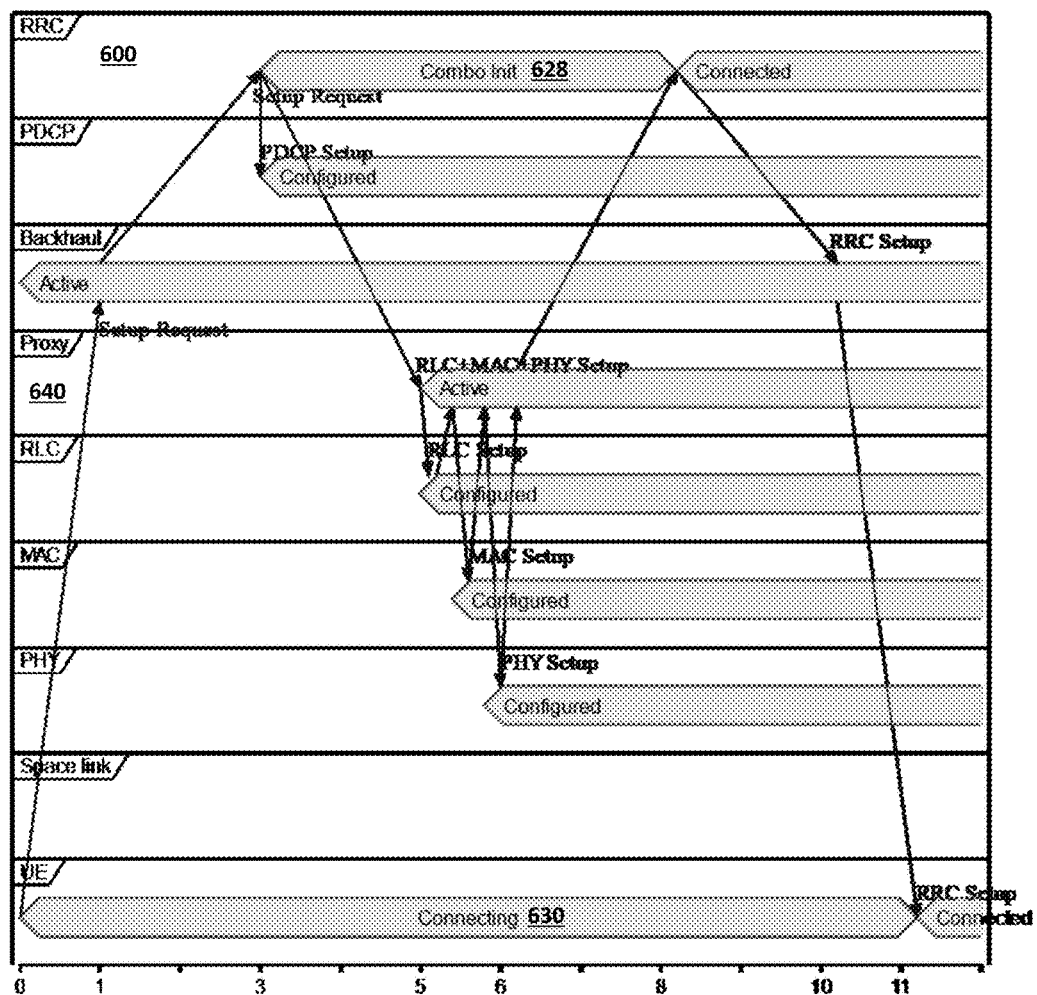
FIG. 6 illustrates a proxy-based protocol layer setup according to various embodiments.

FIG. 6 illustrates a proxy-based protocol layer setup according to various embodiments.

FIG. 6 illustrates a session setup time 630 (latency) can be reduced by a combination initialization 628 for a proxy-based configuration 600. Traffic on a SNP-POP backhaul can be reduced by introducing a configuration proxy 640 on the SNP side. With this approach, an RRC layer sends a single message for SNP configuration to the proxy configuration 640. The proxy 640 configures the RLC, MAC and PHY layers in a serial fashion, thus simplifying the design. The proxy 640 notifies the combination initialization 628 of the initializations of the RLC, MAC and PHY layers The proxy-based configuration 600 reduces the traffic on the SNP-POP backhaul. There are total of 4 messages exchanged on the SNP-POP backhaul (FIG. 6), as opposed to the 8 SNP-POP messages of the serial or parallel configurations (FIG. 4 and FIG. 5, respectively). The reduced SNP-POP message traffic lowers chances of a UE level session timeout due to message loss on the SNP-POP backhaul. The proxy-based configuration also preserves a serial layer setup flow. The intra-SNP serial flow (between the proxy and RLC or MAC or PHY layers) should have a negligible impact on the overall latency.

Access Proxy Based Protocol Layer Configuration

Figure 7:
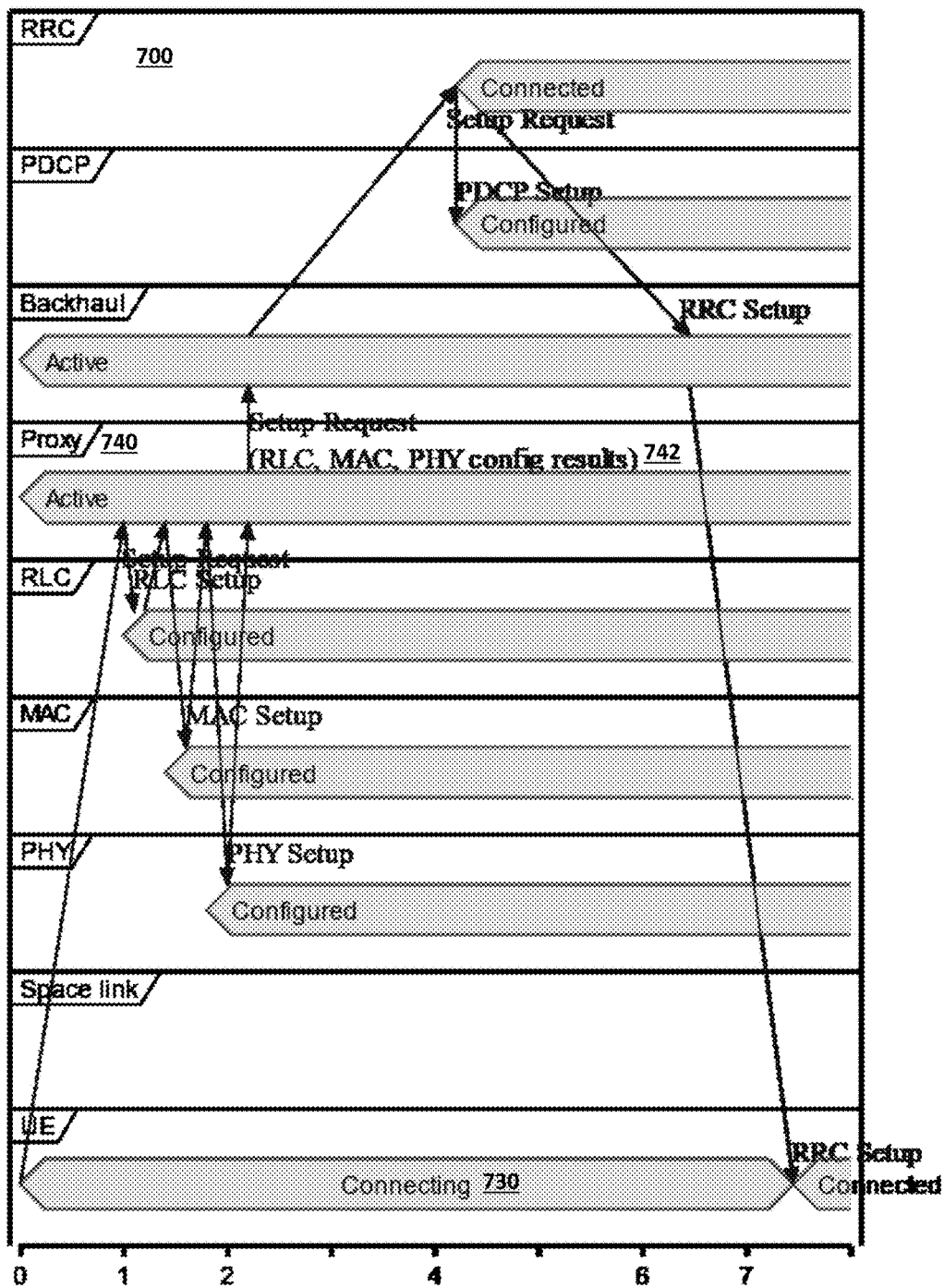
FIG. 7 illustrates an access proxy-based protocol layer setup according to various embodiments.

FIG. 7 illustrates an access proxy-based protocol layer setup according to various embodiments.

FIG. 6 illustrates a session setup time 630 (latency) can be reduced by a combination initialization 628 for a proxy-based configuration 600. The approach presented in FIG. 6 requires two roundtrips over the SNP-POP backhaul. This can be further optimized by triggering the RLC, MAC and PHY setup at the time of processing the RRC setup Request with an access proxy-based configuration 700 of FIG. 7. FIG. 7 illustrates a session setup time 730 (latency) reduced by an access proxy 740 for an access proxy-based configuration 700. The access proxy 740 in the SNP preconfigures the RLC, MAC and PHY layers before a message requesting the session is passed to an RRC layer in the POP. The access proxy-based configuration 700 works at an initial access time as a gateway or SNP is just setting up the signaling radio bearers for the UE, and no core network configuration is needed for setting up the signaling bearers.

The access proxy 740 running on the SNP is responsible for preconfiguring the protocol layers. The access proxy 740 performs serial configuration for the protocol layers. The serial configuration is simple to implement as it preserves the API model for terrestrial protocol stacks. In some embodiments, the access proxy 740 includes all the configuration information for the RLC, MAC and PHY layers in a setup request 742. The RRC layer may extract this pre-configuration and proceed to just configure the PDCP layer.

Advantages of the Access Proxy

A single roundtrip on the SNP-POP backhaul cuts the message traffic to half compared to the proxy scheme illustrated in FIG. 6. The traffic has been cut to quarter of the traffic seen in the unoptimized scheme presented in FIG. 4. A reduction in SNP-POP traffic also reduces the probability of SNP-POP message loss disrupting the session. The reduced SNP-POP roundtrips cut the session setup time considerably. The unoptimized scheme in FIG. 4 resulted in an 18-point delay. The Access Proxy scheme defined in FIG. 7 results in a setup time of about 7.5.

The choice between a Parallel and Proxy based configuration might come down to ease of parallel layer activation. If parallel protocol layer configuration presents a lot of implementation difficulties, the proxy-based solution is preferable. The proxy-based solution permits serial layer activation with minimal overhead. If the SNP-POP link error rate is high, a proxy-based solution will work better. However, if supporting a proxy is not a practical solution, parallel layer activation would be the preferred solution.

The access proxy solution may be preferred when minimizing the latency is the highest priority. This option may shift a part of the RRC state machine to the Proxy running on the SNP. The access proxy should perform well on an unreliable SNP-POP link.

Figure 8:
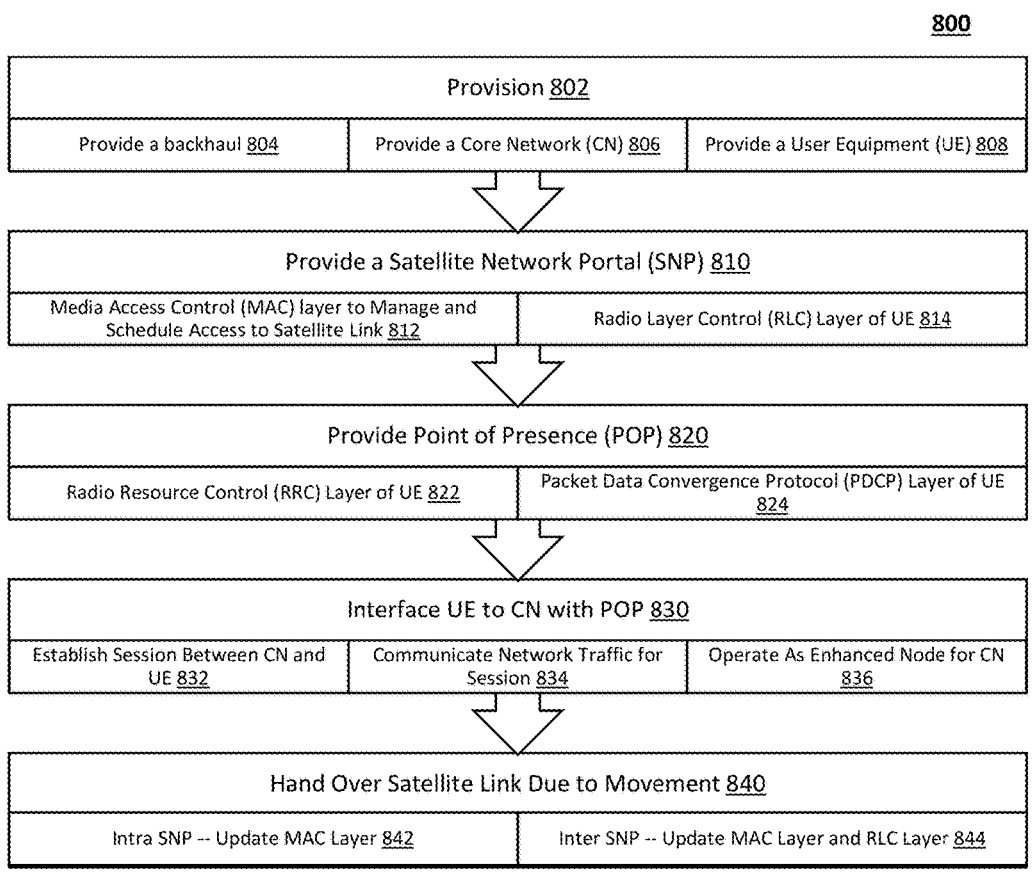
FIG. 8 illustrates a method to interface a user equipment to a core network according to various embodiments.

FIG. 8 illustrates a method to interface a user equipment to a core network according to various embodiments.

A process 800 may include an operation 802 to provision a satellite network. The satellite network may provide a backhaul 804, a Core Network (CN) 806, a User Equipment (UE) 808, a Satellite Network Portal (SNP) 810 and a Provide Point of Presence (POP) 820. The SNP may include a Media Access Control (MAC) layer to manage and schedule access to a satellite link 812, and a Radio Layer Control (RLC) layer of the UE 814. The POP 820 may include a Radio Resource Control (RRC) layer of the UE 822, and a Packet Data Convergence Protocol (PDCP) layer of the UE 824. The process 800 may interface the UE to the CN with the POP 830. establish a session between the CN and the UE 832. The process 800 may communicate network traffic for the session 834. The process 800 may operate as an Enhanced Node for the CN 836. The process 800 may hand over a satellite link due to a movement 840 of the satellite and/or the UE. The hand over may be Intra SNP and need only update the MAC layer 842. The hand over may be Inter SNP and need only update the MAC Layer and the RLC Layer 844. In some embodiments, an update to the MAC layer may update the radio layer.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for interfacing a User Equipment (UE) to a Core Network (CN), the method comprising:
   providing a high latency connection;
   providing a satellite network portal (SNP) to connect to the UE via a satellite link, wherein the SNP comprises a Media Access Control (MAC) layer for managing the satellite link and a Radio Layer Control (RLC) layer of the UE;
   interfacing the UE to the CN with a Point of Presence (POP) comprising a Radio Resource Control (RRC) layer of the UE and a Packet Data Convergence Protocol (PDCP) layer of the UE; and
   establishing a session between the CN and the UE via the RRC layer, the PDCP layer and the RLC layer,
   wherein
      network traffic, between the SNP and the POP, over the high latency connection has a latency greater than 10 milliseconds (ms),
      the session does not timeout due to the latency of the high latency connection, and
      the MAC layer schedules bandwidth for the establishing over the satellite link.

2. The method of claim 1, further comprising communicating the network traffic for the session; and handing over the satellite link from a first beam of the MAC layer to a second beam of the MAC layer.

3. The method of claim 2, wherein the handing over is due to a relative movement between the UE and a satellite.

4. The method of claim 2, wherein the handing over does not result in updates to the PDCP layer servicing the UE.

5. The method of claim 2, wherein a satellite providing the satellite link belongs to a satellite constellation that is not geosynchronous.

6. The method of claim 2, wherein the SNP comprises a first SNP and a second SNP,
   the first SNP comprises the first beam,
   the second SNP comprises the second beam, and
   the session is moved from the RLC layer of the first SNP to the RLC layer of the second SNP.

7. The method of claim 2, wherein a satellite providing the satellite comprises a first satellite and a second satellite,
   the first satellite comprises the first beam, and
   the second satellite comprises the second beam.

8. The method of claim 2, wherein the establishing comprises using one or more of a parallel protocol layer configuration, a proxy-based protocol layer configuration or an access proxy-based protocol layer configuration for communications between the RRC layer and the RLC layer.

9. The method of claim 1, wherein the POP and the SNP, jointly, are configured to operate as an enhanced Node B (eNB) when connected to the CN.

10. The method of claim 1, wherein the establishing comprises using a parallel protocol layer configuration for communications between the RRC layer and the RLC layer.

11. The method of claim 1, wherein the establishing comprises using a proxy-based protocol layer for communications between the RRC layer and the RLC layer.

12. The method of claim 1, wherein the establishing comprises using an access proxy-based protocol layer for communications between the RRC layer and the RLC layer.

13. A system to interface a User Equipment (UE) to a Core Network (CN), the system comprising:
   a high latency connection;
   a satellite network portal (SNP) to connect to the UE via a satellite link, wherein the SNP comprises a Media Access Control (MAC) layer for managing the satellite link and a Radio Layer Control (RLC) layer of the UE;
   a Point of Presence (POP), to interface the UE to the CN, comprising a Radio Resource Control (RRC) layer of the UE and a Packet Data Convergence Protocol (PDCP) layer of the UE; and
   a session established between the CN and the UE via the RRC layer, the PDCP layer and the RLC layer,
   wherein
      network traffic, between the SNP and the POP, over the high latency connection has a latency greater than 10 milliseconds (ms),
      the session does not timeout due to the latency of the high latency connection, and
      the MAC layer schedules bandwidth for the session over the satellite link.

14. The system of claim 13, wherein the POP and the SNP communicate the network traffic for the session, and the SNP hands over the satellite link from a first beam of the MAC layer to a second beam of the MAC layer.

15. The system of claim 14, wherein the SNP hands over due to a relative movement between the UE and a satellite.

16. The system of claim 14, wherein the SNP hand over does not result in updates to the PDCP layer servicing the UE.

17. The system of claim 14, wherein a satellite providing the satellite link belongs to a satellite constellation that is not geosynchronous.

18. The system of claim 14, wherein the SNP comprises a first SNP and a second SNP,
- the first SNP comprises the first beam,
- the second SNP comprises the second beam, and
- the session is moved from the RLC layer of the first SNP to the RLC layer of the second SNP.

19. The system of claim 14, wherein a satellite providing the satellite link comprises a first satellite and a second satellite,
- the first satellite comprises the first beam, and
- the second satellite comprises the second beam.

20. The system of claim 14, wherein the session is established using one or more of a parallel protocol layer configuration, a proxy-based protocol layer configuration or an access proxy-based protocol layer configuration for communications between the RRC layer and the RLC layer.

21. The system of claim 11, wherein the POP and the SNP, jointly, are configured to operate as an enhanced Node B (eNB) when connected to the CN.

\* \* \* \* \*